(12) United States Patent  
Trainin

(10) Patent No.: US 7,551,638 B2
(45) Date of Patent: Jun. 23, 2009

(54) NETWORK INTERFACE WITH TRANSMIT FRAME DESCRIPTOR REUSE

(75) Inventor: Solomon B. Trainin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 643 days.

(21) Appl. No.: 11/095,689

(22) Filed: Mar. 31, 2005

(65) Prior Publication Data

US 2006/0221875 A1 Oct. 5, 2006

(51) Int. Cl.
H04L 12/54 (2006.01)

(52) U.S. Cl. ........................ 370/429; 714/749
(58) Field of Classification Search ........... 370/389, 370/392, 412–414, 417–420, 422, 428, 429; 714/748–749
See application file for complete search history.

(56) References Cited

U.S. PATENT DOCUMENTS

| | | | |
|---|---|---|---|
| 6,047,001 A * | 4/2000 | Kuo et al. | 370/428 |
| 6,631,132 B1 * | 10/2003 | Sourani | 370/389 |
| 6,721,302 B1 | 4/2004 | Alastalo | |
| 6,813,652 B2 | 11/2004 | Stadler et al. | |
| 6,839,345 B2 | 1/2005 | Lu et al. | |
| 6,839,351 B1 * | 1/2005 | Chow et al. | 370/392 |
| 7,058,071 B1 * | 6/2006 | Myles et al. | 370/419 |
| 2003/0152058 A1 | 8/2003 | Cimini, Jr. et al. | |
| 2004/0013115 A1 * | 1/2004 | Su et al. | 370/392 |
| 2004/0203698 A1 | 10/2004 | Comp | |
| 2006/0120375 A1 * | 6/2006 | Ravikumar et al. | 370/392 |

* cited by examiner

Primary Examiner—Ricky Ngo
Assistant Examiner—Pao Sinkantarakorn
(74) Attorney, Agent, or Firm—Schwabe, Williamson & Wyatt, P.C.

(57) ABSTRACT

A network interface unit includes an interface memory coupled to a host memory of a network station, the network station also hosting the network interface unit. The host memory is operable to store a plurality of data frames and a plurality of transmit frame descriptors identifying the plurality of data frames. The network further includes a controller to fetch a first transmit frame descriptor from the host memory and to enable a first transmission of at least one portion of a first data frame in response to the first transmit frame descriptor and to fetch a next transmit frame descriptor from the host memory prior to completion of the first transmission. The controller further is operable to reuse at least the first transmit frame descriptor to enable a retransmission of the at least one portion of the first data frame in response to an absence of an acknowledgment of the first transmission.

24 Claims, 7 Drawing Sheets

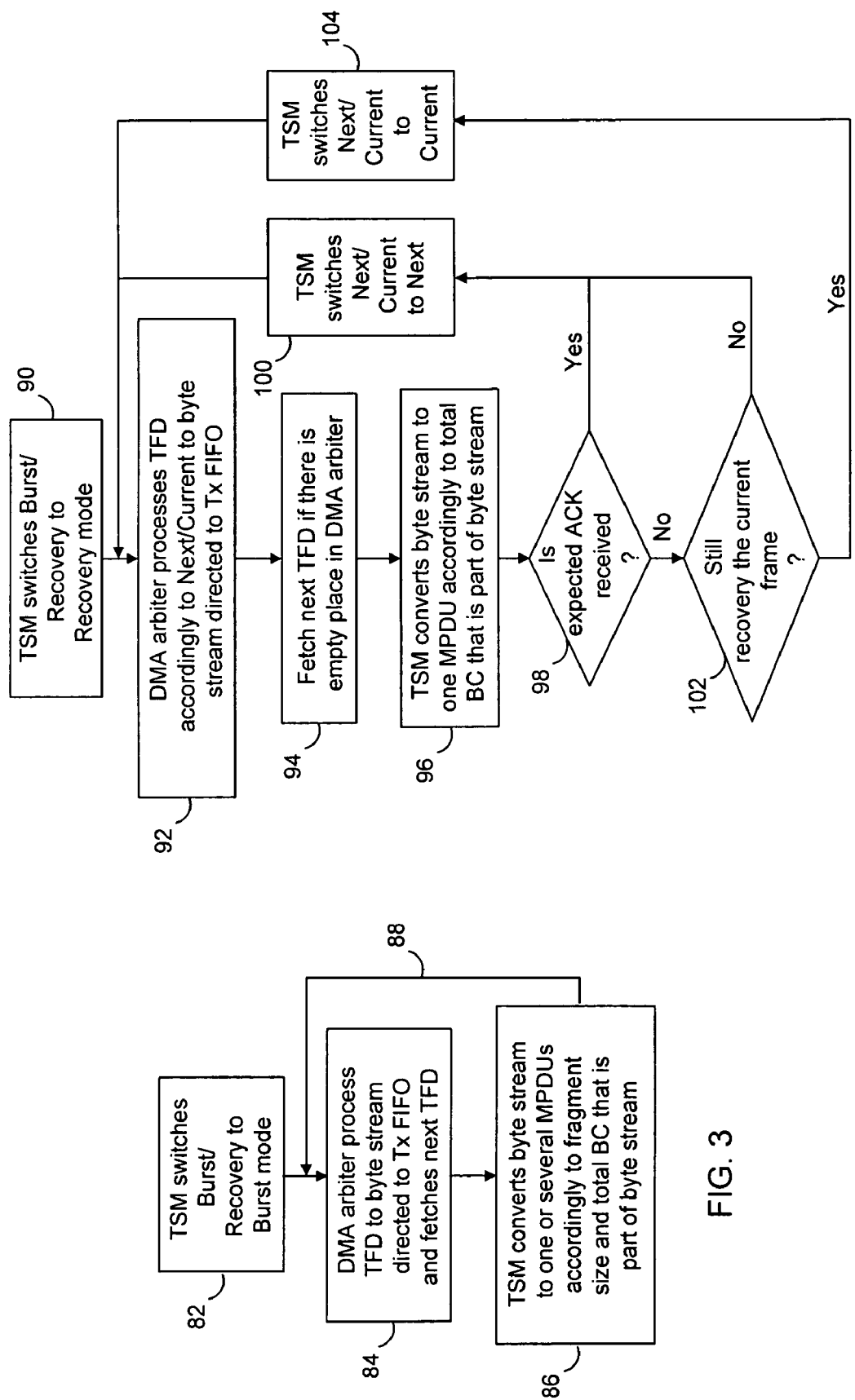

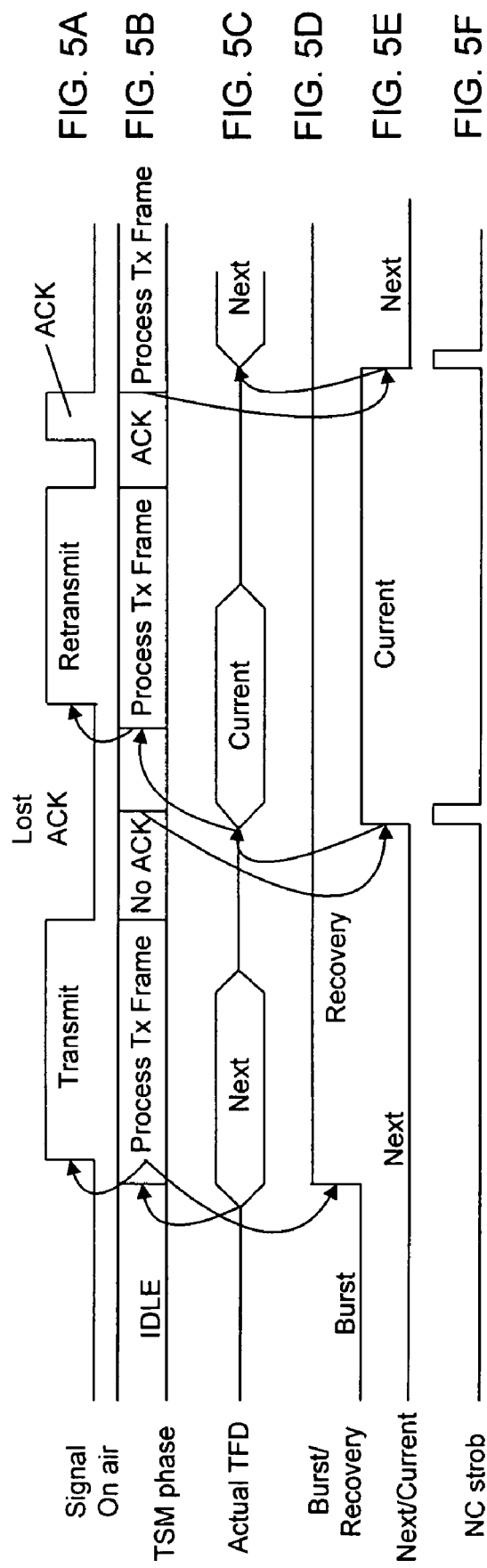

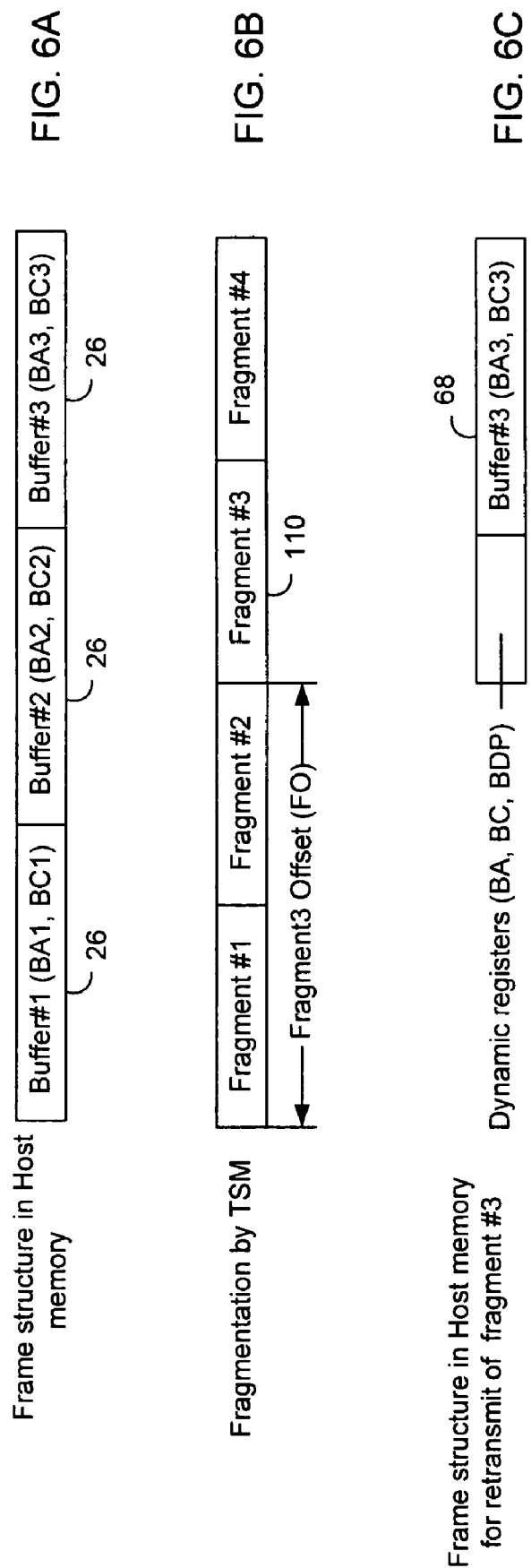

NETWORK INTERFACE WITH TRANSMIT FRAME DESCRIPTOR REUSE

BACKGROUND

1. Technical Field

Embodiments of the present invention are related to the field of electronic devices, and in particular, to network devices.

2. Description of Related Art

Wireless communication systems typically are constructed pursuant to standards promulgated by a regulatory or quasi-regulatory body. For instance, the IEEE 802.11 standard, 1999 edition and subsequent amended variants thereof, promulgated by the IEEE (Institute of Electrical and Electronic Engineering) is a wireless LAN standard pertaining generally to communications at various wireless frequencies including a 5 GHz range and a 2.4 GHz range. The IEEE 802.11 standard specifies an over-the-air interface between a wireless client, e.g, a mobile client station, and a base station or access point, as well as among wireless clients. Set forth in such wireless standards are specifications for a Media Access Control (MAC) layer and a physical (PHY) layer. The standards permit wireless medium sharing between different devices having compatible physical layers. Asynchronous data transfer on the wireless medium may utilize a number of different access methods, such as Carrier Sense Multiple Access with Collision Avoidance (CSMA/CA).

BRIEF DESCRIPTION OF THE DRAWINGS

FIG. 3 is a flow chart of a first mode of operation for the network station of FIG. 1, in accordance with some embodiments, wherein there is burst flow without expectation of data recovery.

FIG. 4 is a flow chart of a second mode of operation for the network station of FIG. 1, in accordance with some embodiments, wherein data recovery is undertaken without fragmentation.

FIGS. 5A-5F are timing diagrams for a transmission/recovery mode without fragmentation of the network station of FIG. 1, in accordance with some embodiments.

FIGS. 6A-6C show, for the network station of FIG. 1, a diagram of a frame structure in the host memory in FIG. 6A, fragmentation of this frame structure by the transmit state machine into fragments in FIG. 6B, and a frame structure in the host memory for retransmission of a third fragment in FIG. 6C, in accordance with some embodiments.

DETAILED DESCRIPTION OF ILLUSTRATIVE EMBODIMENTS

In the following description, for purposes of explanation, numerous details are set forth in order to provide a thorough understanding of the disclosed embodiments of the present invention. However, it will be apparent to one skilled in the art that these specific details are not required in order to practice the disclosed embodiments of the present invention. In other instances, well-known electrical structures and circuits are shown in block diagram form in order not to obscure the disclosed embodiments of the present invention.

Figure 1:
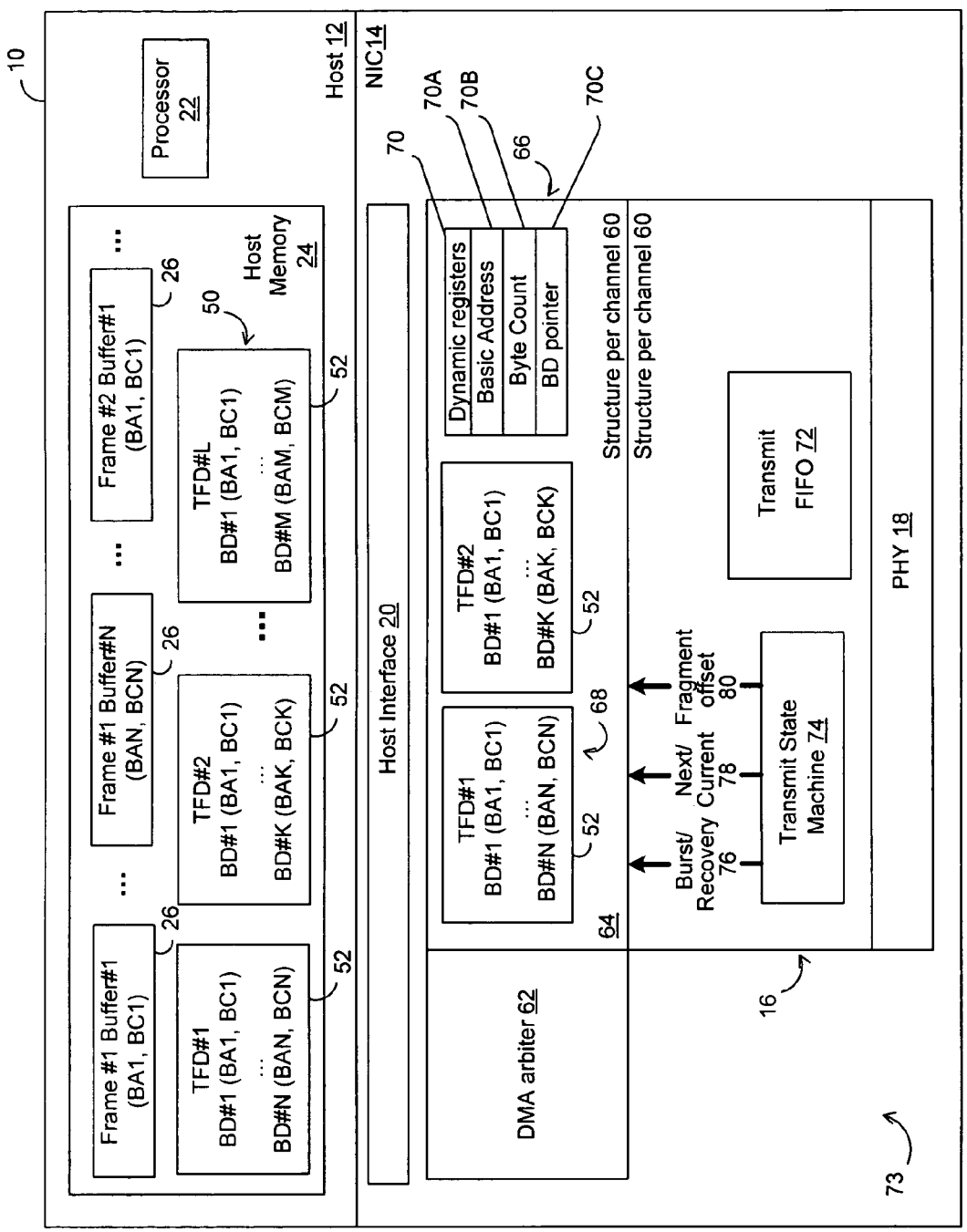
FIG. 1 is a block diagram of a network station according to one embodiment of the present invention.

Referring to FIG. 1, there is illustrated a network station 10 including a host computing device ("host device") 12 and a network interface unit 14 for controlling access to a wireless transmission medium or channel (not shown), in accordance with some embodiments. In one embodiment, the network interface unit 14 may be a Network Interface Card (NIC) or adapter. The NIC and the host device 12 may reside in a single system box, for example, a desktop computer with a built-in network interface. The host device 12 and network interface unit 14 also may reside in separate, interconnected boxes. In other embodiments, the network interface unit 14 may be integrated with a motherboard of host device 12 having a host processor. Hence, the term "network interface unit" is intended to be generic to all network interfaces to the wireless transmission medium. In one embodiment, the wireless transmission medium may be part of a Wireless Local Area Network (WLAN). In one embodiment, the network station 10 may be a mobile client station which is in communications with the wireless medium. In another embodiment, the network station 10 may be an access point or base station which is in communications with the wireless medium. The base stations and mobile client stations may be generically referred to as "network stations" or "stations". During a communication between at least two of the network stations over the transmission medium, a first network station serves as a transmitting network station (or transmitter) and at least one second network station serves as a receiving network station (or receiver). The present disclosure employs various concepts and terminology of the IEEE 802.11 standard for purposes of explanation and illustration of exemplary embodiments, although it is understood that the present invention is not limited to communications according to the IEEE 802.11 standard but instead is applicable to any communication architecture and protocol.

The network interface unit 14 may include a Media Access Control (MAC) unit 16 and a Physical (PHY) unit 18. A host interface 20 may interconnect the host device 12 with the MAC unit 16. In one embodiment, the MAC unit 16 may conform to the MAC sublayer of the data link layer of the Open Systems Interconnect (OSI) model and the PHY unit 18 may conform to the physical layer of the OSI model. The MAC unit 16 may perform data encapsulation/decapsulation, as well as media access management for transmit (TX) and receive (RX) functions. The PHY unit 18 may perform transmit encoding and receive decoding, among other functions and may perform both TX and RX functions for a single network station 10. The host interface 20 may be defined and supported by an underlying hardware bus interface, such as Peripheral Component Interconnect (PCI) or PCI Express. The host interface 20 may enable two-way exchange of data frames between the host device 12 and the MAC unit 16. In particular, the host interface 20 may allow data frames stored in a host memory to be copied directly into an interface memory of the MAC unit 16 by way of Direct Memory Access (DMA) process, as will be described hereinafter.

Figure 2:
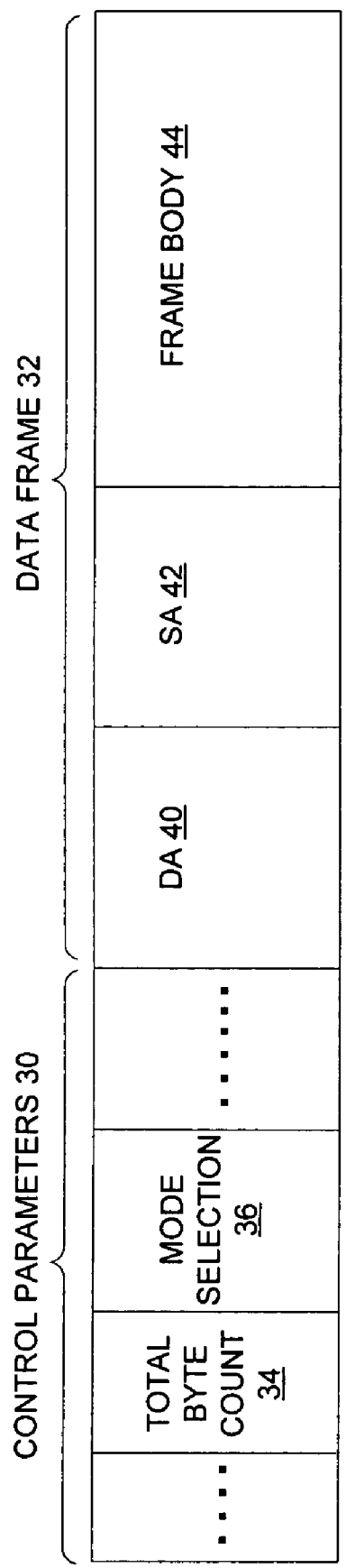
FIG. 2 is a diagram of a transmit command used in the network station of FIG. 1, in accordance with some embodiments.

Referring to FIGS. 1 and 2, the host device 12 may include a processor 22 and a host memory 24 having a plurality of memory buffers 26. Transmit commands 28 (one illustrated in FIG. 2, in accordance with some embodiments, may be stored by the processor 22 in host memory 24. Each transmit command 28 may contain two portions: control parameters segment 30 used internally and a data frame 32 which may be "sent on air" (transmitted over the wireless medium). In one embodiment, the data frame 32 may be a MAC Service Data Unit (MSDU).

Referring to FIG. 2, the control parameters segment 30 may include a number of parameters, with two of the parameters being of particular interest herein: a total byte count 34 for the total number of bytes in the entire transmit command 28 and a mode selection parameter 36 for selecting between one of two general modes of operation: a burst flow mode with no recovery expected and a transmission/recovery mode. The transmission/recovery mode may have two different implementations leading to two different transmission/recovery modes of operation: a transmission/recovery mode with no fragmentation or a transmission/recovery mode with fragmentation, all of which will be described hereinafter. The control parameters may contain a number of other parameters, including parameters for setup of the PHY unit 18 (such as band, channel, modulation type, used antenna, transmit power, transmit rate, frame's length) and parameters for the MAC unit 16 (such as type of security/authentication, encryption key, and protection yes/no and so on). The data frame 32 (e.g., a MSDU) may include a Destination Address (DA) 40, a Source Address (SA) 42, and frame body 44. For example, the DA and SA 40 and 42 may have 48-bit MAC address format.

Each transmit command 28 may be stored in a group of the memory buffers 26, with each memory buffer 26 being characterized by a Basic Address (BA) and a Byte Count (BC). In FIG. 1, a first transmit command 28, identified as Frame #1 is shown stored in N buffers 26, with such buffers 26 being labeled as Buffer#1 through Buffer#N. The beginning of a second transmit command 28, labeled as Frame #2, also is shown. Generally, there are a number of other transmit commands 28 (e.g., Frame #3 and so on) in the host memory 24, but only two are illustrated in FIG. 1.

The host memory 24 also may include a plurality of host transmit queues 50, with each host transmit queue 50 having organized therein a plurality of Transmit Frame Descriptors ("TFDs") 52. In FIG. 1, one host transmit queue 50 is illustrated with L transmit frame descriptors 52 starting with TFD#1 and extending through TFD#L. In one embodiment, there may be one transmit frame descriptor 52 for locating each of the transmit commands 28. More specifically, each transmit frame descriptor 52 may contain a stack of Buffer Descriptors (BDs) describing the buffers 26 used to store a single transmit command 28. With respect to a given transmit frame descriptor 52, each buffer descriptor BD may include a Basic Addresses (BA) and a Byte Counts (BC) of one of the buffers 26 used for storing a single transmit command 28.

The MAC unit 16 may handle a plurality of Direct Memory Access (DMA) channels 60 with different priorities. For example, in one embodiment, each separate DMA channel 60 may be allocated per a Quality of Service (QoS) priority. In the host device 12, there may one host transmit queue 50 in the host memory 24 associated with each of the DMA channels 60 in the network interface unit 14. In this multi-channel embodiment, the MAC unit 16 may include a DMA arbiter 62 for arbitrating which of the plurality of DMA channels 60 may receive data from the host device 12 or transfer data to the host device 12, based upon one of a number of possible priority schemes.

The MAC unit 16 may further include an interface memory 64. The memory 64 may be allocated into memory structures 66, with there being one memory structure 66 for each DMA channel 60. Each memory structure 66 may have its own TFD space 68 and a plurality of dynamic registers 70A-70C. Additionally, each DMA channel 60 may include a transmit (Tx) first-in, first-out (FIFO) register 72. The FIFO registers 72 of the DMA channels 60 collectively may be referred to as the "transmit memory". Each TFD space 68 may include one or more transmit frame descriptors 52 fetched from the host memory 24 by the DMA arbiter 62. In one embodiment, the DMA arbiter 62 may pre-fetch and store at least two transmit frame descriptors 52 in the interface memory 64. The dynamic register 70A may include a Basic Address (BA), the dynamic register 70B may include a Byte Count (BC), and the dynamic register 70C may include a Buffer Descriptor Pointer (BDP), with the BDP pointing to a buffer descriptor of a transmit frame descriptor 52. In one illustrative embodiment, there may be four DMA channels 60; hence, there are four TFD queues 52 in the host memory 24 and four memory structures 66 in the interface memory 64 in this embodiment. Additionally, the MAC unit 16 may include a Transmit State Machine (TSM) 74 for controlling various modes and stages of operation of the network interface unit 14. The transmit state machine 74 may be shared between all channels 60 but may allocate and store data on a per-channel basis. A controller 73 for the network interface unit 14 is defined to include the DMA arbiter 62 and the transmit state machine 74.

In general, the appropriate transmit commands 28 may be transferred (copied) to the network interface unit 14 by the DMA arbiter 62 utilizing master access to the host memory 24 through the host interface 20. More specifically, the DMA arbiter 62 may control in parallel the DMA channels 60 so as to transfer (copy) the data frames of the transmit commands 28 in the memory buffers 26 of the host memory 24 to the appropriate Tx FIFO 72 of a given channel 60. To accomplish this transfer, the DMA arbiter 62 may pre-fetch two transmit frame descriptors 52 from the host transmit queue 50 of the host memory 24 associated with the given channel 60 and place the transmit frame descriptors 52 in the TFD space 68 of its own interface memory 64. In FIG. 1, the illustrative TFD space 68 for one of the channels 60 is shown with TFD#1 and TFD#2 having been fetched from the host memory 24 and placed in the TFD space 68. The DMA arbiter 62 then processes the transmit frame descriptors 52 in the TFD space 68 to transfer (copy) the data frames of the transmit commands 28 from the buffers 26 to the associated Tx FIFO 72. More specifically, the transmit frame descriptors 52 in the TFD space 68 may order the buffer descriptors of the buffers 26 for DMAing data from the buffers 26 to the Tx FIFO 72. This may be repeated for other channels 60 needing data transfers.

In the various embodiments to be described hereinafter involving the transmission/recovery mode, the physical unit 18 transmits one of the data frames or a data frame fragment of the data frames over the wireless medium to another network station (see FIG. 8). The receiving network station may transmit an Acknowledgement (ACK) in response to receiving the data frame or the data frame fragment from the network station 10. The term "data unit" is defined to generically include the quantity of data, either the entire data frame or data frame fragment, which when received by the other network station, causes the other network station to generate an ACK. The data unit also is the quantity of data that is retransmitted due to the absence of an ACK. In one embodiment, using IEEE 802.11 terminology, the "data unit" may be referred to as the MAC Protocol Data Unit (MPDU).

In the embodiments described hereinafter, there is no need for the network interface unit 14 to keep the transmitted data unit (referred to as the "current data unit" after transmission) in local memory after its transmission, even though the current data unit may need to be retransmitted in the event of not receiving an ACK indicating that the data unit has been successfully transmitted. In one embodiment, a first TFD 52

(labeled TFD#1) and a second TFD 52 (labeled TFD#2) may be pre-fetched from the host memory 24 and stored in the TFD space 68 of the interface memory 64, as shown in FIG. 1. The first TFD 52 may be used for obtaining a first data frame from the host memory 24. After the transmission of the first data frame, the first TFD (referred as the "current" TFD after transmission) may be stored in the arbiter memory 64 for as long as a decision about a successful transmission of the current data unit cannot be made. In the event that the transmission of the current data unit fails (no ACK), this current TFD 52 (TFD#1) may be used again to obtain the current data unit from the host memory 24 for retransmission. The second TFD 52 may be associated with the "next data frame" to be transmitted, so that in the event of a successful transmission of the complete first data frame, the next data frame may be taken very quickly from the host memory 24, since its TFD#2 (now referred to as the "next" TFD) is already in place in the TFD space 68.

With respect to the two TFDs 52 in the interface memory 64, one purpose of this arrangement is to form a pipeline of two TFDs; hence, it is desirable to fetch the second TFD as soon as possible after fetching the first TFD. As already mentioned, in one embodiment, the first or the second TFDs may be pre-fetched prior to the first transmission of a first data frame identified by the first TFD. In another embodiment, the second TFD may be fetched later, but prior to the completion of the first transmission of the data frame identified by the first TFD. Every fetched TFD thereafter may be fetched as soon as possible as long as the interface memory 64 has room for storing another TFD. Transferring and having available at least two TFDs may provide a high readiness of starting of the next transmission, whether it be the transmission of a new data unit ("next data unit") or the retransmission of an old data unit ("current data unit"). This is a desirable feature in the network interface unit 14 due of the timing constrains of the wireless protocol. As will be described hereinafter, it also is desirable that the Tx FIFO 72 is adapted to accumulate only a relatively small amount of data ahead of actually sending this data on-the-air, in that this may free up time for the arbiter 62 to undertake pre-fetching of TFDs 52 so that the next TFD is available.

It is not necessary for the FIFO 72 to be large enough to store the entire current data frame while waiting to see if it has been successfully transmitted. Instead, the FIFO 72 only needs to be sized large enough to contain some control information and to accumulate a small amount of the data ahead of actually sending this data; thus, freeing time for pre-fetching TFDs as mentioned above. More specifically, each FIFO 72 may be sized to include only the control parameters of the segment 30 of FIG. 2 and the previously-mentioned relatively small amount of transmit data. Hence, this may allow for a significantly reduced size of the FIFO 72. The silicon for the MAC unit 16 may be smaller and cheaper. In the discussion of the embodiments hereinafter, the term "current" may be used with respect to a data frame or data frame fragment and its associated TFD after it has been transmitted and the term "next" may be used with respect to the next data frame or next data frame fragment and its associated TFD to be transmitted for the first time.

As previously mentioned, in one embodiment, there may be three modes of operation (two of them being transmission/recovery modes), which will now be described in detail. In a first mode, there may be a burst flow of transmitted data unit (e.g., MPDU) from the transmitting station to a receiving network station without any acknowledgement (ACK) being returned by the receiving network station to the transmitting network station upon receipt of an uncorrupted and complete data unit, which may be data frame or fragment of a data frame. More specifically, with the first mode there may be fragmentation of data frames or there may be no fragmentation. With or without fragmentation, there is no expectation of an ACK after transmission of the data unit; hence, there is no retransmission prior to the next data unit being transmitted. In one embodiment, a block acknowledgement may be undertaken as part of the first mode wherein there is a bursting of a number of data frames followed by an acknowledgment of them all in a single block acknowledgement frame. The transmitting and receiving stations will be described hereinafter in more detail in FIG. 8.

In a second mode of operation, there may be recovery of lost data through retransmission of a data frame after its unsuccessful first transmission. In the second mode, the transmitting station may transmit entire frames (e.g., MPDUs) at a time. Hence, the MPDU is the same as the MSDU. In the second mode, there is an expectation of receiving an ACK from the receiving network station after each transmission of one of the data frames. The entire data frame is retransmitted because an ACK from the receiving network station is expected only after transmission of each data frame.

In a third mode of operation, there may be recovery of lost data through retransmission of data frame fragments ("fragments") of the data frame (MSDU). Fragmentation of the MSDU may occur when its length exceeds a fragmentation threshold limit. More specifically, each fragment is a part of one of the data frames. In other words, the entire data frame may be sent as number of fragments. Each fragment but last may be of the same size and equal to fragment threshold. Each fragment may contain a sequential number related to a particular data frame. Hence, the MPDU transmitted by the transmitting network station to the receiving network station comprises fragments of the MSDU. There is an expectation of an ACK from the receiving network station after the transmission of each MPDU (each fragment). The use of fragments instead of entire data frames may reduce the amount of data that can be corrupted by interference and therefore fragmentation may result in higher effective throughput.

The first mode of operation described above may be referred to as the "burst mode" and the second and third modes of operation described above may be generically referred to as the "transmission/recovery modes". The selection between the burst mode and the transmission/recovery modes is specified in the mode selection parameter 36 of the transmit commands 28. The transmit state machine 74 may read this parameter 36, causing it to generate a burst/recovery mode select signal 76 for selecting the burst mode or the transmission/recovery modes. The generated burst/recovery mode select signal 76 is dynamically asserted by the transmit state machine 74 to cause the DMA arbiter 62 to work in the burst mode or the transmission/recovery modes, as will be described hereinafter. In one embodiment, the transmit state machine 74 may select between the two transmission/recovery modes (second and third mode of operation described above) based upon the size of the data frames relative to the fragmentation threshold. If the data frames are larger than the fragmentation threshold, then the third mode may be selected automatically by the transmit state machine 74.

As previously described, in FIG. 1 the TFD space 68 is shown with two transmit frame descriptors 52. The transmit frame descriptor 52 labeled TFD#1 and the transmit frame descriptor 52 labeled TFD#2. The TFD#1 and TFD#2 may allow the DMA arbiter 62 to access and transfer from the host memory 24 two data frames. In the burst mode, the DMA arbiter 62 may switch from using the first TFD#1 to the second TFD#2 upon completion of the data transfer of the first data frame using the first TFD#1. In the transmission/recovery modes, the transmit state machine 74 also may generate a next/current select signal 78. The DMA arbiter 62, in response to "next" signal, may be directed to process and transmit the next data frame, which is identified by the second TFD#2. Depending upon the transmission/recovery mode, this may be one data frame or one data frame fragment at a time, followed by an expectation of an ACK. The transmit state machine 74 may assert the signal 78 as the "current" signal in response to not receiving an ACK. The DMA arbiter 62, in response to the current signal, may be directed to process and retransmit the current data unit. What is meant by "process" of the data unit is that the DMA arbiter 62 provides byte streaming of the data unit from the host memory 24 to the Tx FIFO 72 selected by the DMA arbiter 62.

While in the transmission/recovery modes, the DMA arbiter 62 may save the first TFD#1 until the ACK is received (or an allowed number of retransmissions is exhausted). In the second mode of operation to recover a data frame, the first TFD#1 may be used to again locate the current data unit (data frame) in the host memory 24. In the third mode of operation to recover a fragment, the transmit state machine 74 also may calculate and generate an additional Fragment Offset (FO) signal 89 in order to locate the current data unit (fragment) in the host memory 24 for retransmission, since the first TFD#1 by itself is insufficient to locate a fragment.

As will be described above, the transmit state machine 74 may calculate a Fragment Offset (FO) to locate an unsuccessfully transmitted fragment in the host memory 24 in the third mode of operation for fragment recovery. The dynamic registers 70 may be used in locating the fragment. The dynamic registers 70 may include a Basic Address (BA) register 70A, a Byte Count (BC) register 70B, and a Buffer Descriptor Pointer (BDP) 70C. The contents of BA, BC and BDP contained in the dynamic registers 70 may be calculated when the transmit state machine 74 asserts the fragment offset signal 80. DMA arbiter 62 may use these registers 70 to locate the buffer descriptors (BDs) of the buffers 26 containing the fragment for retransmission. These same values may be used until the registers 70 are reset. In summary, the transmit state machine 74 may control the mode of the DMA arbiter 62, may switch between the processing of the next data unit and the current data unit in the transmission/recovery mode, and may prepare frames for transmission (e.g., fragmentation of an MSDU to a number of MPDUs).

The following discussion will explain the behavior of single DMA channel 60 during the previously-described three modes of operation. Each of the three modes of operation starts with the transmit state machine 74 processing the control parameters segment 30 of the transmit command 28 and based upon the control parameters segment 30, selecting one of the three modes of operation.

A flow chart of the first mode of operation, the burst mode with no recovery, in accordance with some embodiments, is shown in FIG. 3. Referring to FIGS. 1-3, after reading the control parameters segment 30, at a stage 82 of FIG. 3 the transmit state machine 74 may assert the burst/recovery mode select signal 76 to be "burst" so that the network station 10 to the first mode. At a stage 84 of FIG. 3, the DMA arbiter 62 may fetch one of transmit frame descriptors 52 from the host memory 24 and place it in the TFD space 68 of the interface memory 64. In response, the DMA arbiter 62 may process the transmit frame descriptor 52 to perform a data transfer in the form of master byte streaming of the data unit(s), either a data frame or the fragments of a data frame, to the associated Tx FIFO 72 and may fetch the another transmit frame descriptor 52 from the host memory 24. At a stage 64, the transmit state machine 74 may convert the byte stream to one MPDU (no fragmentation) or several MPDUs (with fragmentation) according to a comparison of the desired fragment size (determined by the fragmentation threshold) and the total byte size (byte count 34 of FIG. 2). The byte size BC may be part of the byte stream from the host memory 24. After the transmit state machine 74 processes the byte stream of the data frame, the DMA arbiter 62, as illustrated by the return path 88, processes the next transmit frame descriptor 52 to transfer the next data frame. Hence, the DMA arbiter 62 may process the transmit frame descriptors 52 one-by-one without waiting for ACKs. The data frame or data frame fragments may be transferred from the Tx FIFO 72 to PHY unit 18 for transmission over the wireless medium. In this first mode, no interaction is needed between the transmit state machine 74 and DMA arbiter 62. In other words, when the signal 76 is asserted as "burst", the DMA arbiter 62 is in its default mode of operation. Neither the next/current signal or the fragment offset signal is used.

A flow chart of the second mode of operation, the transmission/recovery mode with no fragmentation, in accordance with various embodiments, is shown in FIG. 4. Referring to FIGS. 1, 2 and 4, for these embodiments, after reading the control parameters segment 30 of the transmit command 28, at a stage 90 of FIG. 4, the transmit state machine 74 may assert the burst/recovery mode select signal 76 to be "recovery" so as to switch the network station 10 to the second mode. This switch to the second mode may occur while processing the control parameters segment 30. At a stage 92, the DMA arbiter 62 processes already fetched transmit frame descriptor, either the current TFD or next TFD, and enables byte streaming to the current data frame or next data frame, respectively, from the host memory 24 to the Tx FIFO 72. Selection of the current or next TFD is determined by the next/current select signal 78 from the transmit state machine 74. At a stage 94, in parallel with byte streaming, the DMA arbiter 62 also may fetch another next transmit frame descriptor from host memory 24 if there is empty place in its interface memory 64. At a stage 96, the transmit state machine 74 may convert the byte stream from the host memory 24 to one MPDU according to the total byte count BC that is part of the byte stream (assumes the data frame does not exceed the fragmentation threshold). At a stage 98, the DMA 62 determines whether the expected acknowledgement (ACK) has been received. If the ACK has been received ("yes"), then the operation branches to stage 100, where the transmit state machine 74 switches its next/current select signal 78 from the current signal to next signal and returns to stage 92 so that the next TFD is processed to transfer the next data frame. If the ACK has not been received ("no"), then at stage 102, there may be a determination as to whether to attempt to recover the current transmitted frame. At the stage 102, there may be implemented a limit on the number of retries. If the limit is exceed ("no"), then the operation may proceed to the previously-described stage 100. If the limit has not been received ("yes"), then the operation may proceed to a stage 104 where the transmit state machine 74 switches the next/current select signal 78 to the current signal. The operation returns to stage 92 so as to again process the current TFD for the retransmission of the current data frame.

In summary, under transmission/recovery mode, the DMA arbiter 62, after the transmission of the first data unit, may not start "next TFD" processing until assertion of the next/current select signal 78 to "next". The transmit state machine may assert next/current after the first data frame processing is completed. If expected ACK is received or retries limit on retransmissions of the data frame is exceeded, the transmit state machine may assert the "next" signal and DMA arbiter 62 may start processing of the "next TFD". If there is a need for frame recovery, then the transmit state machine 74 may assert the "current" signal and the DMA arbiter 62 may start processing of the "current TFD" to retransmit the same current data frame. As will be described hereinafter, in a specific example, the next/current select signal 78 may be accompanied by a strobe.

In FIGS. 5A through 5F provide timing diagrams for the network station 10 of FIG. 1 to show a specific example of how the transmission/recovery mode works, in accordance with various embodiments. Arrows are used between the timing diagrams show cause and effect relationships between sequences of events. FIG. 5A (labeled "Signal On air") illustrates a transmitted data unit (MPDU) by the PHY unit on the wireless medium, followed by the absence of an ACK ("Lost ACK"). This in turn results in the retransmission of the data unit by the PHY unit, followed this time with an ACK from the receiving station. FIG. 5B (labeled "TSM phase") shows the phases of the TSM 74 during the transmission/recovery mode, with the TSM 74 starting in an idle phase. FIG. 5C (labeled "Actual TFD") shows a next TFD for a first transmission and a current TFD for a retransmission, as processed by the DMA arbiter. FIG. 5D (labeled "Burst/Recovery) is the burst/recovery signal from the TSM showing the switching of the network station from the burst mode to the transmission/recovery mode. FIG. 5D is the next/current signal from the TSM showing the switching of the TSM from the next TFD to the current TFD. FIG. 5E (labeled "NC strob") shows a strobe signal for switching the DMA arbiter between processing the next TFD and the current TFD.

In this illustrative example shown in FIGS. 5A-5F, the first pre-fetched "next TFD" of FIG. 5C located in the interface memory may cause the transmit state machine (TSM) to process the control parameters segment of a transmit command in the host memory identified by this pre-fetched, next TFD, as shown by the first "process TX frame" in FIG. 5B. Upon processing the control parameter segment of the transmit command, the TSM uses its burst/recover signal to switch from the default burst mode to the transmission/recovery mode, as shown if FIG. 5D, and causes the PHY unit to transmit a MPDU ("Transmit") over the wireless medium, as shown in FIG. 5A. As shown in FIG. 5A, there is a "lost ACK", with the absence of the ACK being recognized by the TSM in accordance to an expected ACK timeout and shown by the "No ACK" in the TSM phase of FIG. 5B. In response to the no ACK, the TSM changes its Next/Current signal from Next signal to Current signal, as shown in FIG. 5E. In response to the change in the Next/Current signal, the actual TFD of FIG. 5C changes to the Current TFD (previously transmitted TFD). Again, the TSM phase of FIG. 5B changes to "Process Tx Frame", which causes the DMA arbiter to retransmit the current data frame as shown in FIG. 5A. Upon receiving the ACK to the retransmitted current frame as shown in FIG. 5A, the TSM recognizes receipt of the ACK and the TSM phase of FIG. 5B shows an ACK. The receipt of the ACK may cause the TSM to change its Next/Current signal from Current to Next, which in turn causes the Next TFD in FIG. 5C to be processed by the DMA arbiter. The changing of the Next/Current signal of FIG. 5E is accomplished by the strobe signal of FIG. 5F.

Figure 7:
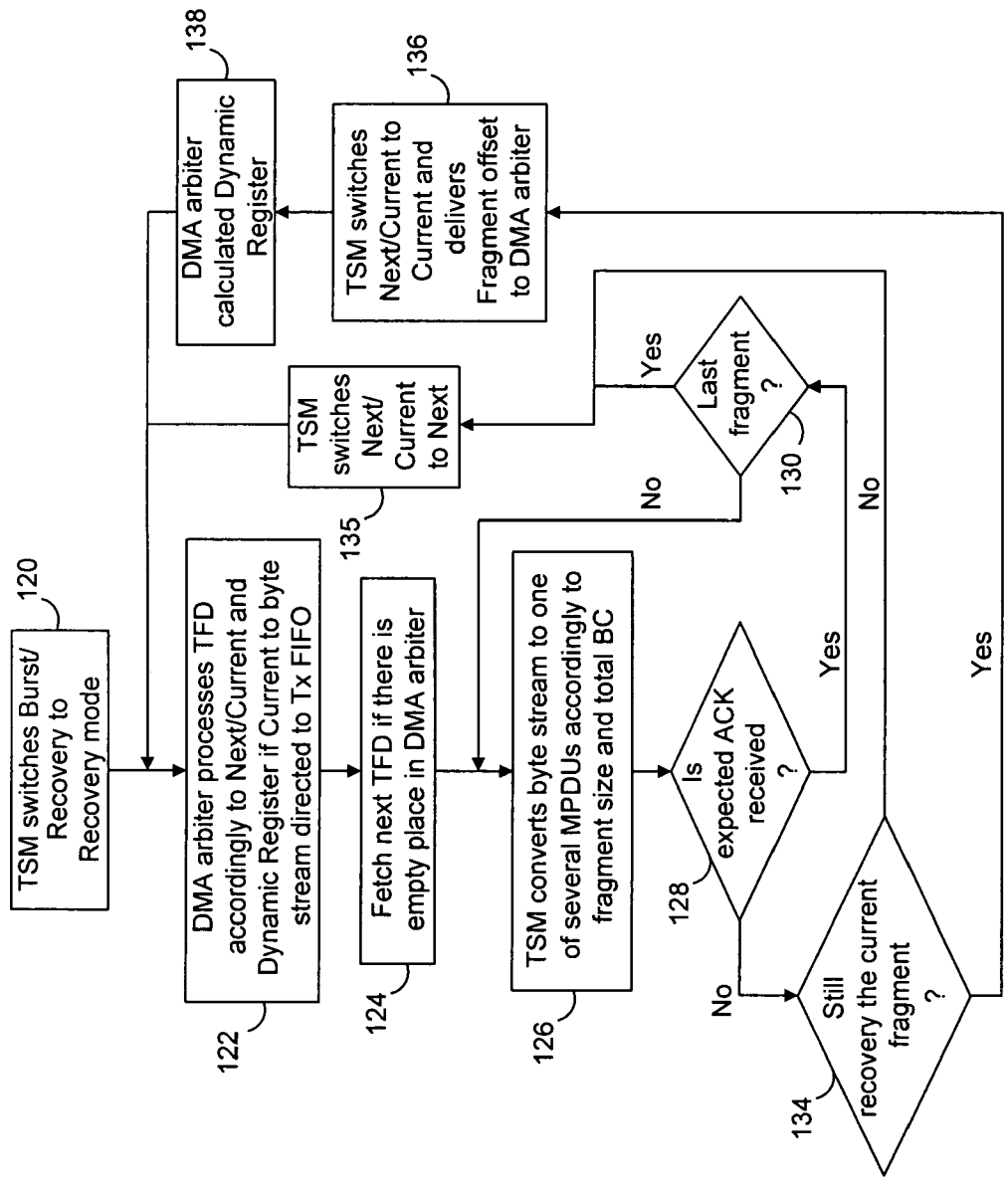
FIG. 7 is a flow chart of a third mode of operation for the network station of FIG. 1, in accordance with some embodiments, wherein there is of data recovery with fragmentation.

A flow chart of the third mode of operation, the recovery with fragmentation mode, in accordance with some embodiments, is shown in FIGS. 6A-6C and a flow chart of FIG. 7. FIG. 6B shows the fragmentation of the data frames of the transmit commands of FIG. 2. Fragment recovery may work similar to the frame recovery described in FIG. 4. One difference may be that the transmit state machine 74 by itself may construct fragments 110 of FIG. 6B from the byte stream. The transmit state machine 74 is not aware of the structure of the buffers 26 in the host memory 24 and knows only the absolute fragment's offset FO. For fragment recovery, the byte stream may be restarted by DMA arbiter 62 from beginning of the unsuccessful fragment to recover this fragment and deliver all remaining fragments.

Referring to FIGS. 1 and 6A, the frame structure of a part of a data frame of one of the transmit commands in the host memory is shown, with the first three memory buffers 26 being illustrated for a given data frame 32 of FIG. 2. As the transmit command is fetched from the buffers 26, the TSM 74 may arrange the data frame (MSDU) into a plurality of fragments 110 (MPDUs), with the fragments 110 being labeled in FIG. 6B as Fragment#1, Fragment#2, and so on. The length of each fragment 110 may be determined by setting a fragment threshold, which comprises a predetermined number of bytes. The beginning of each fragment 110 may be determined by a fragment offset (FO) measured from the beginning of the data frame 32 of FIG. 2. In FIG. 6B, the frame offset is shown for a third Fragment#3, labeled as the "Fragment3 Offset". In FIG. 6C, it is assumed that the Fragment #3 was lost and should be retransmitted. The transmit state machine 74 delivers the Fragment#3 offset to the DMA arbiter 62. The DMA arbiter 62 then may calculate the values for the dynamic registers 70, which may include three values: BA, BC, and BDP shown in FIG. 6C. Also, the DMA arbiter 62 may activate a byte stream from appropriate BA and BC at "current" signal activation. Dynamical registers may have stored therein the values BA=BA2+FO−BC1, BC=BC1+BC2−FO, BDP=3 and may substitute the BA2, BC2 of Buffer#2 and may point to the buffer#3 as "next" buffer descriptor. So the lost Fragment#3 and yet-not-delivered Fragment#4 may be properly sent by the transmit state machine 74.

Referring to FIGS. 1 and 7, in various embodiments, after reading the control portion of a transmit command of FIG. 2, at a stage 120 of FIG. 7, the transmit state machine 74 may assert the burst/recovery mode select signal 76 to switch the network station 10 to the transmission/recovery mode (third mode of operation). At a stage 122, the DMA arbiter 62 may process a TFD (current or next TFD) according to the next/current select signal (and also according to the dynamic register if the next/current select signal is "current") so as to establish a byte stream to the Tx FIFO 72. At a stage 124, the DMA arbiter 62 may fetch a next TFD if there is an empty place in the interface memory 64 for the DMA arbiter 62. At a stage 126, the transmit state machine 74 may convert the byte stream from the host memory 24 to one of several fragments (MPDUs) according to the fragment size (determined by the fragmentation threshold) and the total BC. At a stage 128, there is a determination as to whether an ACK has been obtained. If the ACK has been received, then the operation branches to stage 130, where there is a determination as to whether this is the last fragment of a transmit command. If "yes" to being the last fragment, at a stage 132, the next TFD may be processed by the TSM 74 setting its next/current select signal 78 to the "next" signal. If "no" to being the last fragment, then the operation returns to the already-described stage 126. If the ACK has not been received at stage 128, then at stage 134, there is a determination as to whether to attempt to recover the current transmitted fragment. At the stage 134, there may be implemented a limit on the number of retries. If the limit is exceed ("no" branch), then the operation may proceed to the previously-described stage 132. If the limit has not been exceeded ("yes" branch), then the operation proceeds to a stage 136 where the transmit state machine 74 sets its next/current select signal 78 to the "current" signal and delivers the fragment offset to the DMA arbiter 62. At a stage 138, the DMA arbiter 62 may calculate the values for the dynamic registers 70. The operation returns to stage 122 so that the current fragment is located in host memory 24 and copied to one of the FIFOs 72 for retransmisson.

Figure 8:
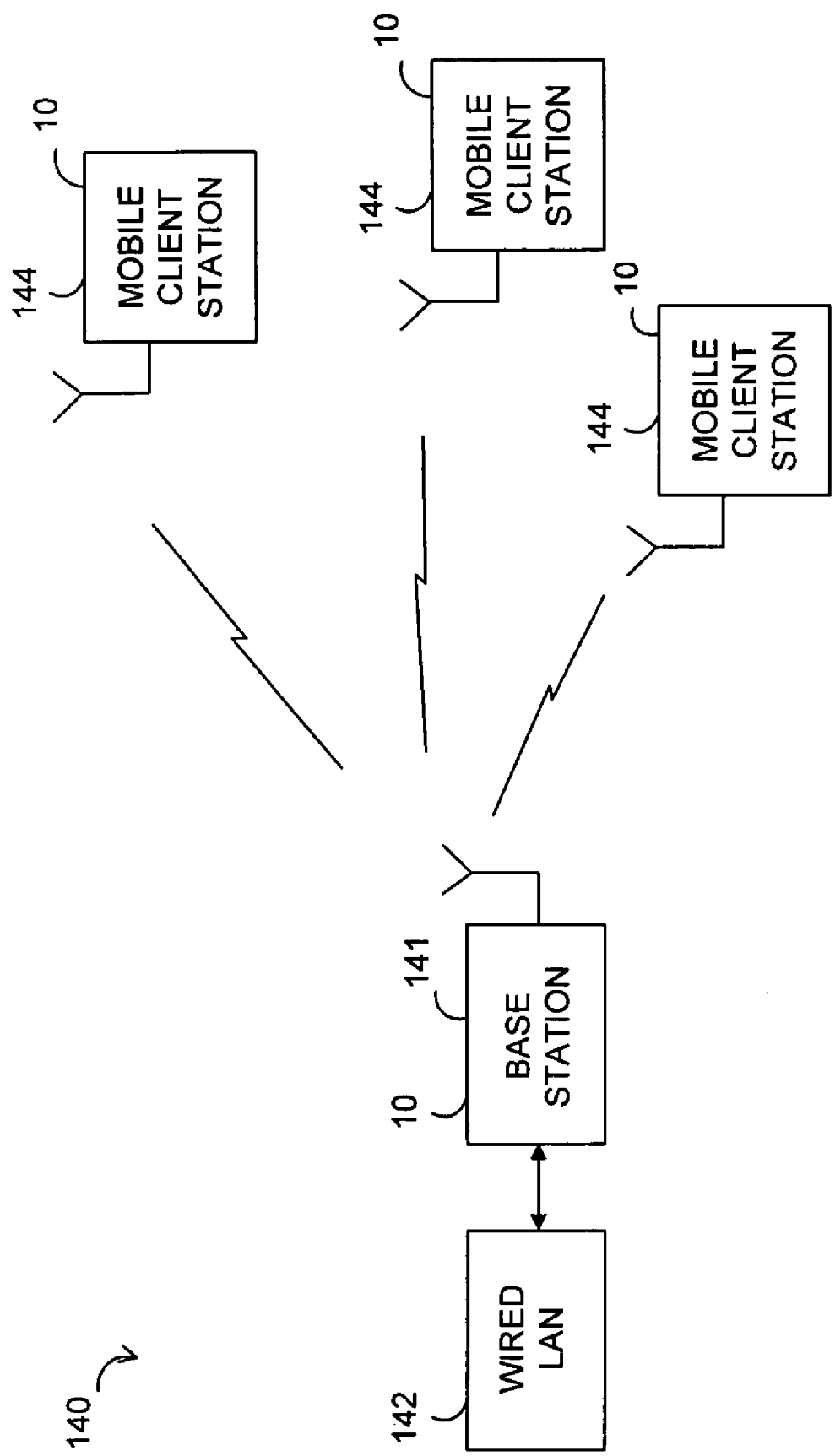
FIG. 8 is a block diagram of a communications system including a plurality of network stations of FIG. 1, in accordance with some embodiments.

A wireless local area network (WLAN) communication system 140 is illustrated in FIG. 8, in accordance with various embodiments. The network system 140 is illustrative of one of a number of systems wherein the network station 10 of FIG. 1, in accordance with one embodiment of the present invention, may be implemented. One network station 10 in the form of a base station (access point) 141 may provide access to a network, such as a wired LAN 142 for one or more mobile client stations 144. Although not shown, one or more additional base stations may also be coupled to the wired LAN 142 to provide wireless access for additional mobile client devices. The wired LAN 142 may include, for example, one or more servers for providing client/server functions within the network system 140. The wired LAN 142 may also include functionality for providing a connection to another network (e.g., the Internet, a wide area network, etc.). The mobile client stations 144 may include any of a wide variety of different digital data handling devices including, for example, laptop, palmtop, and/or desktop computers; personal digital assistants (PDA); pagers; and/or others. The number of user devices that can be supported by a base station 10 may vary from system to system. Each network station 10 (base station 141 and mobile client stations 144) may represent a combination of hardware, software and firmware that appears to other stations as a single functional and addressable unit on the network.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A network station, comprising:
  a host device including a host memory to store a plurality of data frames and a plurality of transmit frame descriptors, the plurality of transmit frame descriptors describing a location of a corresponding data frame within the host memory;
  a network interface unit, coupled to the host device, including a controller to fetch a first one of the transmit frame descriptors from the host memory to enable a first transmission of at least one portion of a first one of the plurality of data frames based on the first transmit frame descriptor and to fetch a next one of the transmit frame descriptors from the host memory prior to completion of the first transmission, wherein the first and next transmit frame descriptors are stored in an interface memory of the network interface unit, the interface memory being different than the host memory; and
  the controller being operable to reuse at least the first transmit frame descriptor stored in the interface memory to recover the first data frame from the host memory to enable a retransmission of the at least one portion of the first data frame in response to an absence of an acknowledgment of the first transmission; wherein
  the controller, after transmission of the first data frame, is operable to enable a next transmission of a next one of the data frames in response to the next transmit frame descriptor;
  the network interface unit further includes a transmit memory coupled to the host memory; and a physical unit, coupled to the transmit memory and the controller, to transmit the at least one portion of the first data frame; and
  the controller includes a direct memory access (DMA) arbiter to copy the first and the next transmit frame descriptors to the interface memory and to copy the first and the next data frames to the transmit memory based on the first and the next transmit frame descriptors, and a transmit state machine configured to select one of a plurality of modes for transmission including a burst flow mode and a transmission recovery mode.

2. The network station according to claim 1, wherein the controller is operable to fetch the first and the next transmit frame descriptors from the host memory prior to the first transmission.

3. The network station according to claim 1, wherein
  the host memory is operable to form a plurality of buffers; the plurality of buffers are arranged into a plurality of groups of buffers with at least one group of the buffers including one of a plurality of transmit commands, with a first transmit command including the first data frame and a next transmit command including the next data frame; and
  the first and the next transmit frame descriptors each includes a plurality of buffer descriptors for identifying one of the groups of buffers.

4. The network station according to claim 1, wherein
  the at least one portion of the first data frame includes the first data frame; and
  the controller, in response to the absence of the acknowledgment of the first transmission, is operable to enable byte streaming the first data frame from the host memory to a transmit memory to retransmit the first data frame.

5. The network station according to claim 1, wherein
  the at least one portion of the first data frame includes a fragment of the first data frame; and
  the controller, in response to the absence of the acknowledgment of the first transmission, is operable to enable the retransmission of the fragment.

6. The network station according to claim 1, wherein
  the controller is operable to segment the first data frame into a plurality of fragments, with the at least one portion of the first data frame being a first fragment; and
  the controller is operable to generate, in response to the absence of the acknowledgement of the first transmission, a fragment offset used in locating the first fragment in the host memory and to enable the retransmission of the first fragment.

7. The network station according to claim 6, wherein the controller, in response to an acknowledgement of the first transmission, is operable to enable transmission of a next fragment of the first data frame.

8. The network station according to claim 7, wherein
  the host memory includes a plurality of groups of buffers; a first one of a plurality of transmit commands being stored in a first one of the groups of buffers; the first one of the plurality of transmit commands including the first data frame; and
  the first transmit frame descriptor includes a plurality of buffer descriptors for identifying the first one of the groups of buffers.

9. The network station according to claim 8, wherein the controller further includes a transmit state machine to segment the first data frame into the plurality of fragments in response to a length of the first data frame exceeding a fragmentation threshold and to generate the fragment offset in response to the absence of the acknowledgment of the first transmission.

10. The network station according to claim 9, wherein the first one of the plurality of transmit commands includes a control parameters segment including information regarding a mode of transmission for the first one of the plurality of transmit commands, the transmit state machine is responsive to the control parameters segment and the absence of the acknowledgement of the first transmission to enable the DMA arbiter to undertake the retransmission of the first fragment.

11. The network station according to claim 6, wherein
the network interface unit further includes an interface memory coupled to the host memory; a transmit memory coupled to the host memory; and a physical unit coupled to the transmit memory and the controller; and
the controller further includes a direct memory access (DMA) arbiter to copy the first and the next transmit frame descriptors from the host memory to the interface memory; and the DMA arbiter is operable to be responsive in part to the fragment offset and the first transmit frame descriptor to locate the first data frame fragment in the host memory and to copy the first fragment to the transmit memory for the retransmission by the physical unit.

12. The network station according to claim 1, wherein the transmit memory is operable to store a plurality of first-in, first-out (FIFO) registers; the DMA arbiter is operable to copy the first and the next data frames from the host memory to one of the FIFO registers selected by the DMA arbiter.

13. The network station according to claim 12, wherein at least one of the plurality of FIFO registers has a first memory size less than a second memory size needed to store all of the first data frame.

14. The network station according to claim 12, wherein the host memory is operable to form a plurality of queue memories, with at least one of the queue memories including a plurality of transmit frame descriptors; and the DMA arbiter is operable to use the plurality of transmit frame descriptors to transfer a subset of the plurality of data frames identified by the plurality of transmit frame descriptors to one of the plurality of FIFO registers.

15. A network interface unit, comprising:
a controller, responsive to a host memory in a network station, to fetch a first one of a plurality of transmit frame descriptors from the host memory to enable a first transmission of at least one portion of a first one of a plurality of data frames the plurality of transmit frame descriptors describing a location of a corresponding data frame within the host memory, and to fetch a subsequent one of the transmit frame descriptors from the host memory prior to completion of the first transmission, wherein the first and subsequent ones of the transmit frame descriptors are stored in an interface memory of the network interface unit, and to reuse at least the first transmit frame descriptor stored in the interface memory to recover the first data frame from the host memory to enable a retransmission of the at least a portion of the first data frame in response to an absence of an acknowledgment of the first transmission; wherein
the controller, after transmission of the first data frame, is operable to enable a next transmission of a next one of the data frames in response to the next transmit frame descriptor;
the network interface unit further includes a transmit memory coupled to the host memory; and a physical unit, coupled to the transmit memory and the controller, to transmit the at least one portion of the first data frame; and
the controller includes a direct memory access (DMA) arbiter to copy the first and the next transmit frame descriptors to the interface memory and to copy the first and the next data frames to the transmit memory based on the first and the next transmit frame descriptors, and a transmit state machine configured to select one of a plurality of modes for transmission including a burst flow mode and a transmission recovery mode.

16. The network interface unit according to claim 15, wherein the controller is operable to fetch the first and the subsequent transmit frame descriptors from the host memory prior to the first transmission.

17. The network interface unit according to claim 15, wherein
the controller is operable to segment the first data frame into a plurality of fragments, with the at least one portion of the first data frame being a first fragment; and
the controller is operable to generate, in response to the absence of the acknowledgement of the first transmission, a fragment offset used in locating the first fragment in the host memory and to enable the retransmission of the first data frame fragment.

18. The network interface unit according to claim 17, wherein
the network interface unit further includes a transmit memory coupled to the host memory; and a physical unit coupled to the transmit memory and the controller; and
the controller further includes a direct memory access (DMA) arbiter to copy the first and the subsequent transmit frame descriptors from the host memory to the interface memory; and the DMA arbiter is operable to be responsive in part to the fragment offset and the first transmit frame descriptor to locate the first data frame fragment in the host memory and to copy the first fragment to the transmit memory for the retransmission by the physical unit.

19. The network interface unit according to claim 18, wherein the transmit memory is operable to form a plurality of first-in, first-out (FIFO) registers; the DMA arbiter is operable to copy the first and the subsequent data frames from the host memory to one of the FIFO registers selected by the DMA arbiter; and at least one of the plurality of FIFO registers has a first memory size less than a second memory size needed to store all of the first data frame.

20. A system, comprising:
a first network station including
a host device including a host memory to store a plurality of data frames and a plurality of transmit frame descriptors, the plurality of transmit frame descriptors describing a location of a corresponding data frame within the host memory;
a network interface unit, coupled to the host device, including a controller to fetch a first one of the transmit frame descriptors from the host memory and to enable a first transmission of at least one portion of a first one of the data frames to a second network station based on the first transmit frame descriptor and to fetch a next one of the transmit frame descriptors from the host memory prior to completion of the first transmission, wherein the first and next ones of the transmit frame descriptors are stored in an interface memory of the network interface unit, the network interface unit being different than the host memory;

the controller further is operable to reuse at least the first transmit frame descriptor stored in the interface memory to recover the first data frame from the host memory to enable a retransmission of the at least one portion of the first data frame to the second network station in response to an absence of an acknowledgment of the first transmission from the second network station; and the first and the second network stations being communicatively coupled to each other over a wireless medium, wherein the controller, after transmission of the first data frame, is operable to enable a next transmission of a next one of the data frames in response to the next transmit frame descriptor;

the network interface unit further includes a transmit memory coupled to the host memory; and a physical unit, coupled to the transmit memory and the controller, to transmit the at least one portion of the first data frame; and the controller includes a direct memory access (DMA) arbiter to copy the first and the next transmit frame descriptors to the interface memory and to copy the first and the next data frames to the transmit memory based on the first and the next transmit frame descriptors, and a transmit state machine configured to select one of a plurality of modes for transmission including a burst flow mode and a transmission recovery mode.

21. The system according to claim 20, wherein the controller is operable to fetch the first and the next transmit frame descriptors from the host memory prior to the first transmission.

22. The system according to claim 20, wherein the first network station is a base station providing an access point; and the second network station is a client mobile station.

23. A method, comprising:

transferring a first transmit frame descriptor from a host memory of a network station to an interface memory of a network interface unit, wherein the host memory is different than the interface memory and the network station hosts the network interface unit;

using the first transmit frame descriptor in the network to enable a first transmission of at least one portion of a first data frame stored in the host memory, the first transmit frame descriptor identifying a location of the at least one portion of the first data frame in the host memory;

transferring a next transmit frame descriptor from the host memory to the interface memory at least prior to the completion of the first transmission;

reusing at least the first transmit frame descriptor to identify the location of the at least one portion of the first data frame in the host memory to enable a retransmission of the at least one portion of the first data frame in response to an absence of an acknowledgment of the first transmission; and after transmission of the first data frame, using the next transmit frame descriptor to enable a next transmission of a next data frame;

wherein the network interface unit further includes a transmit memory coupled to the host memory; and a physical unit, coupled to the transmit memory and a controller, to transmit the at least one portion of the first data frame; and the controller includes a direct memory access (DMA) arbiter to copy the first and the next transmit frame descriptors to the interface memory and to copy the first and the next data frames to the transmit memory based on the first and the next transmit frame descriptors, and a transmit state machine configured to select one of a plurality of modes for transmission including a burst flow mode and a transmission recovery mode.

24. The method according to claims 23, wherein the transferring of the next transmit frame descriptor from the host memory to the interface memory includes transferring the next transmit frame descriptor prior to the first transmission.

* * * * *